United States Patent
Ichikawa et al.

(10) Patent No.: US 12,095,906 B2
(45) Date of Patent: Sep. 17, 2024

(54) SECRET SURVIVAL DATA PROCESSING SYSTEM, SECRET SURVIVAL DATA PROCESSING APPARATUS, SECRET SURVIVAL DATA PROCESSING METHOD, AND PROGRAM

(71) Applicant: NIPPON TELEGRAPH AND TELEPHONE CORPORATION, Tokyo (JP)

(72) Inventors: Atsunori Ichikawa, Musashino (JP); Dai Ikarashi, Musashino (JP); Koki Hamada, Musashino (JP); Ryo Kikuchi, Musashino (JP); Hiroki Sudo, Musashino (JP); Ibuki Mishina, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 289 days.

(21) Appl. No.: 17/760,765

(22) PCT Filed: Oct. 2, 2019

(86) PCT No.: PCT/JP2019/038978
§ 371 (c)(1),
(2) Date: Mar. 16, 2022

(87) PCT Pub. No.: WO2021/064911
PCT Pub. Date: Apr. 8, 2021

(65) Prior Publication Data
US 2022/0360431 A1    Nov. 10, 2022

(51) Int. Cl.
*H04L 9/08* (2006.01)

(52) U.S. Cl.
CPC .......... *H04L 9/085* (2013.01); *H04L 2209/46* (2013.01)

(58) Field of Classification Search
CPC ..... H04L 9/085; H04L 2209/46; G06F 21/32; G09C 1/00
See application file for complete search history.

(56) References Cited

U.S. PATENT DOCUMENTS

2021/0004494 A1* 1/2021 Veeningen .............. H04L 9/008

OTHER PUBLICATIONS

Koko et al., "Fundamentals of Statistical Analysis in Biomedical Research: Analysis of Survival Data," Drug Delivery System, vol. 30, No. 5, 2015, pp. 474-484 (22 pages including computer generated English Translation).

* cited by examiner

*Primary Examiner* — Michael Simitoski
*Assistant Examiner* — Hany S. Gadalla
(74) *Attorney, Agent, or Firm* — XSENSUS LLP

(57) ABSTRACT

The present invention provides techniques to calculate the number of surviving and the number of deaths while still concealing survival time data. The present invention includes: a group data position calculation means configured to calculate a share $[[g^A]]$ of a sequence $g^A$ and a share $[[g^B]]$ of a sequence $g^B$ represented by predetermined equations from a share $[[g]]$ of a sequence g of values of group of survival time data included in a survival time data set D; a group data number calculation means configured to calculate a share $[[s^A]]$ and a share $[[s^B]]$ from a share $[[t]]$ of a sequence t of values of time of survival time data included in the survival time data set D, the share $[[g^A]]$, and the share $[[g^B]]$, by $[[s^A]]$=GroupSum($[[g^A]], [[t]]$), $[[s^B]]$=GroupSum($[[g^B]], [[t]]$); and a survival number calculation means.

8 Claims, 8 Drawing Sheets

SECRET SURVIVAL DATA PROCESSING SYSTEM, SECRET SURVIVAL DATA PROCESSING APPARATUS, SECRET SURVIVAL DATA PROCESSING METHOD, AND PROGRAM

CROSS-REFERENCE TO RELATED APPLICATION

The present application is based on PCT filing PCT/JP2019/038978, filed Oct. 2, 2019, the entire contents of which are incorporated herein by reference.

TECHNICAL FIELD

The present invention relates to secure computing techniques, and particularly relates to techniques for secure computing of survival time data used in a logrank test.

BACKGROUND ART

Logrank test (see NPL 1) is known as a test technique for comparing the number of survivors among two groups, and is used, for example, in measuring the effects of reagents or clinical trials.

FIG. 1 illustrates an example of survival time data used in a logrank test. As in the survival time data of FIG. 1, each specimen (data) has a time t, a binary state $s \in \{0, 1\}$, and a group $g \in \{A, B\}$ as attributes. Specific examples of the attribute values of the state s and the group g include, for example, {0=observation censored, 1=death}, {A=actual drug administration, B=placebo administration}, and the like.

The logrank test is a technique that reveals the presence or absence of statistical differences of probability of survival for each of groups A and B. The principle of the logrank test is the same as the $\chi^2$ test. That is, assuming that there is no difference in the probability of survival of the two groups (which is referred to as null hypothesis), the logrank test calculates the expected value of the number of specimens in death (i.e., s=1) at each time and calculates how far apart from the actual observed value. The specific calculation method is as follows.

(1) For the set of survival time data, calculate the values of (a) to (e) below for each time $t_i (i=0, \ldots, k-1$, where $k-1$ is smaller than the number of specimens n).

(a) The number of surviving $n^A_i$ of group A, the number of surviving $n^B_i$ in group B (here, the number of surviving at time $t_i$, is the number of specimens where neither death nor observation censoring has occurred immediately before time $t_i$)

(b) The total number of survival $n_i = n^A_i + n^B_i$ (c) The number of deaths $o^A_i$ in group A, the number of deaths $o^B_i$ in group B (here, the number of deaths at time $t_i$ is the number of specimens where new death (s=1) was observed at time $t_i$)

(d) The total number of deaths $o_i = o^A_i + o^B_i$ (e) The expected value of the number of deaths in group A $e^A_i = n^A_i \times (o_i / n_i)$ (2) Calculate the difference U between the number of deaths and the expected value for group A by the following equation.

$$U = \sum_{i=0}^{k-1} (o^A_i - e^A_i) \quad \text{[Math. 1]}$$

(3) Calculate the variance V of the difference U by the following equation.

$$V = \sum_{i=0}^{k-1} \frac{n^A_i n^B_i o_i (n_i - o_i)}{n_i^2 (n_i - 1)} \quad \text{[Math. 2]}$$

(4) Calculate the p-value from the value $U^2/V$ and the $\chi^2$ distribution with the degree of freedom 1.

After this, it is determined whether there is a difference between the two groups by comparing the p-value to a significance level.

Meanwhile, a method called secure computing is known as a method for obtaining a specific arithmetic result without restoring concealed numerical values (see Reference NPL 1). In Reference NPL 1, concealment is performed by distributing pieces of numerical values into three secure computing apparatuses, and the three secure computing apparatuses perform a cooperative calculation so as to perform addition, subtraction, multiplication, logical operations, (left or right) bit shift, or the like without restoring the numerical values. Thus, the calculated results can be maintained in a distributed state in the three secure computing apparatuses, that is, in a concealed state. Generally, the number of distribution is not limited to 3 but can be W (W is a predetermined constant greater than or equal to 3), and a protocol that implements secure computing by coordinated calculation with W secure computing apparatuses is referred to as a multi-party protocol.

(Reference NPL 1: Naoto Kiribuchi, Dai Igarashi, Koki Hamada, and Ryo Kikuchi: "MEVAL3: A Library for Programmable Secure Computation," Symposium on Cryptography and Information Security (SCIS), 2018.)

For real number calculation of secure computing, for example, a secure computing method for floating point numbers has been proposed in Reference NPL 2.

(Reference NPL 2: M. Aliasgari, M. Blanton, Y. Zhang and A. Steele, "Secure Computation on Floating Point Numbers," 20th Annual Network and Distributed System Security Symposium, NDSS2013, San Diego, California, USA, Feb. 24-27, 2013, The Internet Society 2013.)

CITATION LIST

Non Patent Literature

NPL 1: Koko Asakura, Toshirnitsu Hamasaki, "Fundamentals of Statistical Analysis in Biomedical Research: Analysis of Survival Data," Drug Delivery System, 30-5, 2015.

SUMMARY OF THE INVENTION

Technical Problem

Plaintext calculations are assumed in the conventional logrank tests. However, using plaintext calculations in logrank tests which often deal with privacy information, such as clinical data, may cause privacy infringement, especially when the data holders and analysts are different. Thus, it is conceivable to apply secure computing to logrank tests, but there is a problem that the number of surviving or the number of deaths from the concealed survival time data cannot be obtained.

Thus, an object of the present invention is to provide techniques to calculate the number of surviving and the number of deaths while still concealing survival time data.

Means for Solving the Problem

An aspect of the present invention is a secure survival time data processing system comprising at least three secure survival time data processing apparatuses, the secure survival time data processing system being configured to calculate a share $[[n^A]]$ of the number of surviving $n^A$ per time of group A and a share $[[n^B]]$ of the number of surviving $n^B$ per time of group B, from a share $[[D]]$ of a survival time data set D, where data including values of three attributes of time, state, and group is referred to as survival time data, D refers to a set of N pieces (where N is an integer greater than or equal to 1) of survival time data (herein referred to as a survival time data set), a set of survival time data in which a value of group is A is referred to as group A, and a set of survival time data in which a value of group is B is referred to as group B, the secure survival time data processing system comprising: a group data position calculation means configured to calculate a share $[[g^A]]$ of a sequence $g^A$ and a share $[[g^B]]$ of a sequence $g^B$ represented by following equations from a share $[[g]]$, where $[[g]]$ is a share of a sequence g of a plurality of values of group of survival time data included in the survival time data set D;

$$g_i^A = \begin{cases} 1 & (g_i = A) \\ 0 & (g_i \neq A) \end{cases}$$

$$g_i^B = \begin{cases} 1 & (g_i = B) \\ 0 & (g_i \neq B) \end{cases}$$ [Math. 3]

(where, $g_i$, $g_i^A$, and $g_i^B$ ($1 \leq i \leq N$) represent an i-th element in the sequence g, an i-th element in the sequence $g^A$, and an i-th element in the sequence $g^B$, respectively), a group data number calculation means configured to calculate a share $[[s^A]]$ and a share $[[s^B]]$ from a share $[[t]]$, the share $[[g^A]]$, and the share $[[g^B]]$, by $[[s^A]]$=GroupSum ($[[g^A]]$, $[[t]]$), ($[[s^B]]$=GroupSum ($[[g^B]]$, $[[t]]$), where $[[t]]$ is a share of a sequence t of a plurality of values of time of survival time data included in the survival time data set D; and a survival number calculation means configured to calculate the share $[[n^A]]$ and the share $[[n^B]]$ from the share $[[s^A]]$ and the share $[[s^B]]$.

An aspect of the present invention is a secure survival time data processing system comprising at least three secure survival time data processing apparatuses and being configured to calculate a share $[[o^A]]$ of the number of deaths $o^A$ per time of group A and a share $[[o^B]]$ of the number of deaths $o^B$ per time of group B, from a share $[[D]]$ of a survival time data set D, where data including a plurality of values of three attributes of time, state, and group is referred to as survival time data, D refers to a set of N pieces (where N is an integer greater than or equal to 1) of survival time data (herein referred to as a survival time data set), a set of survival time data in which a value of group is A is referred to as group A, and a set of survival time data in which a value of group is B is referred to as group B, the secure survival time data processing system comprising: a group data position calculation means configured to calculate a share $[[g^A]]$ of a sequence $g^A$ and a share $[[g^B]]$ of a sequence $g^B$ represented by following equations from a share $[[g]]$, where $[[g]]$ is a share of a sequence g of a plurality of values of group of survival time data included in the survival time data set D;

$$g_i^A = \begin{cases} 1 & (g_i = A) \\ 0 & (g_i \neq A) \end{cases}$$ [Math. 4]

$$g_i^B = \begin{cases} 1 & (g_i = B) \\ 0 & (g_i \neq B) \end{cases}$$

(where, $g_i$, $g_i^A$, and $g_i^B$ ($1 \leq i \leq N$) represent an i-th element in the sequence g, an i-th element in the sequence $g^A$, and an i-th element in the sequence $g^B$, respectively), a death data position calculation means configured to calculate a share $[[d^A]]$ and a share $[[d^B]]$ represented by following equations from a share $[[s]]$, the share $[[g^A]]$, and the share $[[g^B]]$, where $[[s]]$ is a share of a sequence s of a plurality of values of state of survival time data included in the survival time data set D (where 1 represents death and 0 represents other states); and $$[[d_i^A]] = [[s_i]] \times [[g_i^A]]$$

$$[[d_i^B]] = [[s_i]] \times [[g_i^B]]$$ [Math. 5]

(where, $[[d_i^A]]$, $[[d_i^B]]$, and $[[s_i]]$ ($1 \leq i \leq N$) represent an i-th element of the share $[[d^A]]$, an i-th element of the share $[[d^B]]$, and an i-th element of the share $[[s]]$, respectively), a death number calculation means configured to calculate the share $[[o^A]]$ and the share $[[o^B]]$ from a share $[[t]]$, the share $[[d^A]]$, and the share $[[d^B]]$, where $[[t]]$ is a share of a sequence t of a plurality of values of time of survival time data included in the survival time data set D.

Effects of the Invention

According to the present invention, the number of surviving or the number of deaths can be calculated while still concealing the survival time data.

DESCRIPTION OF EMBODIMENTS

Figures 1, 2:
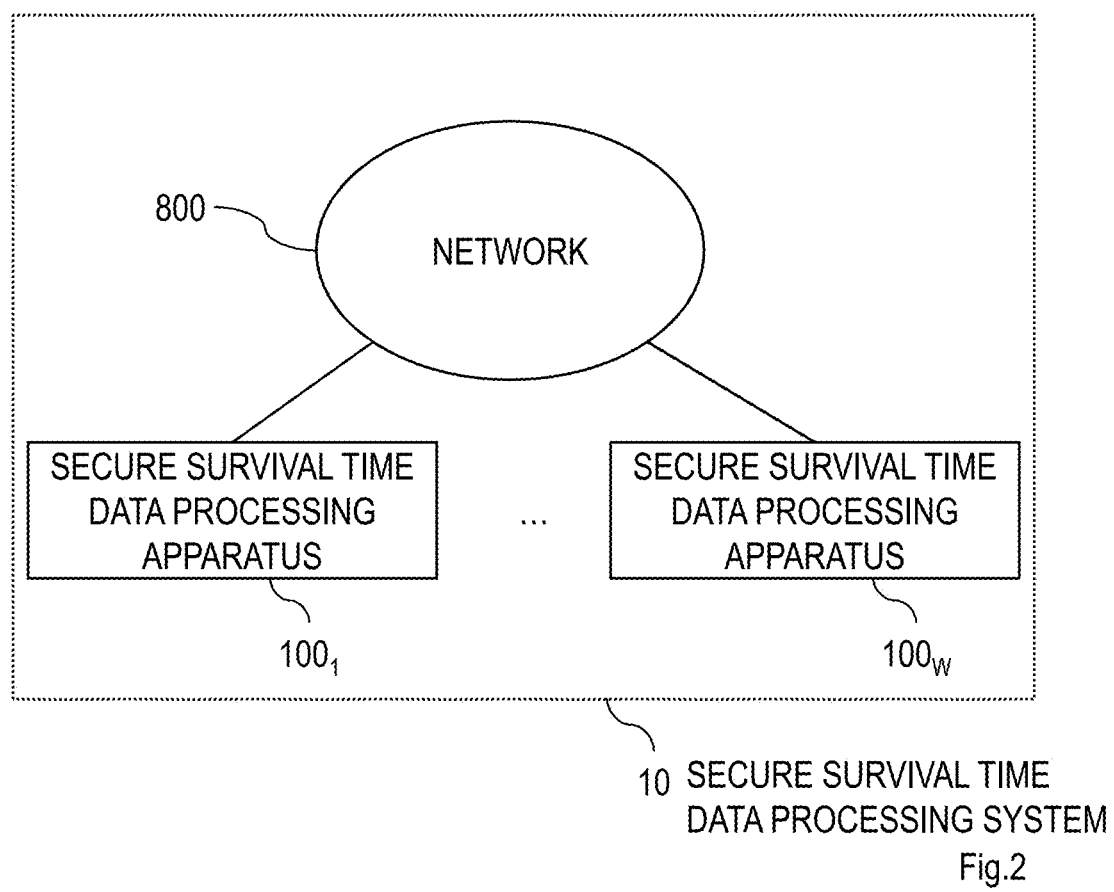
FIG. 1 is a diagram illustrating an example of survival time data.
FIG. 2 is a block diagram illustrating a configuration of a secure survival time data processing system 10.

Hereinafter, embodiments of the present invention will be described in detail. Note that components having the same functions are denoted by the same reference signs, and redundant description thereof will be omitted.

Prior to describing each embodiment, the method of notation herein will be described.

_(underscore) represents the subscript. For example, $x^{y\_z}$ represents $y_z$ is the superscript to x, and $x_{y\_z}$ represents $y_z$ is the subscript to x.

A superscript "^" or "~", such as ^x or ~x to a character x, should be described otherwise above "x", but are described as ^x or ~x, under the limitations of the written description herein.

TECHNICAL BACKGROUND

The secure computing according to each embodiment is built up in combination of existing operations of secure computing. The operations required for the secure computing are concealment, arithmetic operation, equal sign determination, inequality sign determination, secure batch mapping, and group sum. Each of the operations will be described below.

[Concealment]

[[x]] is a value concealed by secret sharing of x (hereinafter referred to as a share of x). Any method can be used for the secret sharing method. For example, Shamir secret sharing on GF ($2^{61}$-1), or replicated secret sharing on $Z_2$ may be used. It is to be noted that because double brackets are typically used in patent amendments to delete the subject matter between the double brackets, the claims are written to use double parenthesis and instead of double brackets used throughout the specification. Therefore, double parenthesis within the claims mean the same as double brackets described herein.

Multiple secret sharing methods may be used in combination in one algorithm. In this case, the components are converted to each other as appropriate.

For an N-dimensional vector x=($x_1$, ... $x_N$), [[x]]:= ([[$x_1$]], ..., [[$x_N$]]). In other words, [[x]] is a vector where the share [[$x_n$]] of the n-th element $x_n$ of x is the n-th element. Similarly, for M×N matrix A=($a_{m,n}$)(1≤m≤M, 1≤n≤N), [[A]] is a matrix where the share [[$a_{m,n}$]] of the (m, n) element $a_{m,n}$ of A is the element (m, n). Here, a:=b represents that a is defined by b.

Note that x is a plaintext of [[x]].

Methods for determining [[x]] from x (concealment) and methods for determining x from [[x]] (restoration) specifically include methods described in Reference NPL 3 and Reference NPL 4.

(Reference NPL 3: Koji Chida, Koki Hamada, Dai Igarashi, Katsumi Takahashi, "A Lightweight Three-party Secure Function Evaluation with Error Detection and Its Experimental Result," In CSS, 2010.)

(Reference NPL 4: Shamir, A., "How to share a secret", Communications of the ACM, Vol. 22, No. 11, pp. 612-613, 1979.)

[Arithmetic Operation]

An addition [[x]]+[[y]] (also represented as add ([[x]], [[y]])) by secure computing outputs [[x+y]] with [[x]] and [[y]] as inputs. A subtraction [[x]]−[[y]] (also represented as sub([[x]], [[y]])) by secure computing outputs [[x−y]] with [[x]] and [[y]] as inputs. A multiplication [[x]]×[[y]] (also represented as mul([[x]], [[y]])) by secure computing outputs [[x×y]] with [[x]] and [[y]] as inputs. A division [[x]]/[[y]] (also represented as div([[x]], [[y]])) by secure computing outputs [[x/y]] with [[x]] and [[y]] as inputs.

Note that any of [[x]] and [[y]] may be a value not concealed (hereinafter referred to as a "public value"). For example, with β and γ as public values, [[x+β]] can be output with [[x]] and β as inputs, or [[γ×y]] can be output with γ and [[y]] as inputs.

Specific methods of arithmetic operation include methods described in Reference NPL 5 and Reference NPL 6.

(Reference NPL 5: Ben-Or, M., Goldwasser, S, and Wigderson, A., "Completeness theorems for non-cryptographic fault-tolerant distributed computation", Proceedings of the twentieth annual ACM symposium on Theory of computing, ACM, pp. 1-10, 1988.)

(Reference NPL 6: Gennaro, R., Rabin, M. O, and Rabin, T., "Simplified VSS and fast-track multiparty computations with applications to threshold cryptography", Proceedings of the seventeenth annual ACM symposium on Principles of distributed computing, ACM. pp. 101-111, 1998.)

[Equal Sign Determination, Inequality Sign Determination]

An operation of equal sign determination by secure computing [[x]]=$_?$[[y]] outputs a share [[x=$_?$y]] of a Boolean value x=$_?$y of a predicate that "x and y are equal", with [[x]] and [[y]] as inputs. Operations of inequality sign determination by secure computing [[x]]≤$_?$[[y]] and [[x]]≥$_?$[[y]] output a share [[x≥$_?$y]] of a Boolean value x≤$_?$y of a predicate that "x is less than or equal to y" and a share [[x≥$_?$y]] of a Boolean value x≥$_?$y of a predicate that "x is greater than or equal to y", respectively, with [[x]] and [[y]] as inputs.

Specific methods of equal sign determination and inequality sign determination include methods described in Reference NPL 1.

[Secure Batch Mapping]

A secure batch mapping is a function of calculating a lookup table, which is a technique that can arbitrarily define the domain of definition and range of values of functions to be calculated. The secure batch mapping performs processing in a vector unit, so the secure batch mapping has a property that it is effective in performing the same processing on a plurality of inputs. The secure batch mapping is a function defined as follows.

The secure batch mapping is to output a share that maps a share of each element of the vector, i.e., [[y]]:= ([[$y_1$]], ..., [[$y_N$]]) such that $a_p$≤$x_n$<$a_{p+1}$ and $y_n$=$b_p$ for 1≤n≤N, by using a parameter ($a_1$, ..., $a_K$) representing a domain of definition and a parameter ($b_1$, ..., $b_K$) representing a range of values of a function f(x) (where $a_1$, ..., $a_K$, $b_1$, ..., $b_K$ are real numbers, and meet $a_1$<...<$a_K$), with a share [[x]]=([[$x_1$]], ..., [[$x_N$]]) of a vector x=($x_1$, ..., $x_N$) as an input.

Alternatively, the secure batch mapping may be defined as follows. The secure batch mapping is to output a share [[y]]=([[$y_1$]], ..., [[$y_N$]]) of a vector y=($y_1$, ..., $y_N$) (where $y_n$=f($x_n$)(1≤n≤N)), with a share [[x]]=([[$x_1$]], ..., [[$x_N$]]) of a vector x=($x_1$, ..., $x_N$) as an input, for a parameter ($a_1$, ..., $a_K$) representing a domain of definition and a parameter (f($a_1$), ..., f($a_K$)) representing a range of values of function f(x)(where $a_1$, ..., $a_K$ are real numbers, and meet $a_1$<...<$a_K$).

The operation by the secure batch mapping defined as described above is expressed as [[y]]=Map$_f$([[x]]).

For example, the algorithm of the secure batch mapping described in Reference NPL 7 can be used.

(Reference NPL 7: Koki Hamada, Dai Igarashi, Koji Chida, "A Batch Mapping Algorithm for Secure Function Evaluation," IEICE Transactions A, Vol. J96-A, No. 4, pp. 157-165, 2013.)

[Group Sum]

The group sum is secure computing that calculates the sum of elements belonging to the same group for each group, and outputs it as a vector. The group sum outputs a share of a vector c having the sum for each group as an element, with shares [[a]] and [[b]] of vectors a and b as inputs. Here, for the i-th element $b_i$ of the vector b, a set of all $j \in \{1, \ldots, N\}$ that satisfies $b_i = b_j$ is referred to as group $G_{b\_i}$, and the vector c is a vector with the value of the following relationship as an element, for each element $b_i$ of the vector b sorted and having the overlapping values deleted.

$$\sum_{j \in G_{b_i}} a_j \quad \text{[Math. 6]}$$

This operation is expressed as [[c]]=GroupSum ([[a]], [[b]]).

Specific methods of group sum include methods described in Reference NPL 1.

First Embodiment

Figure 3:
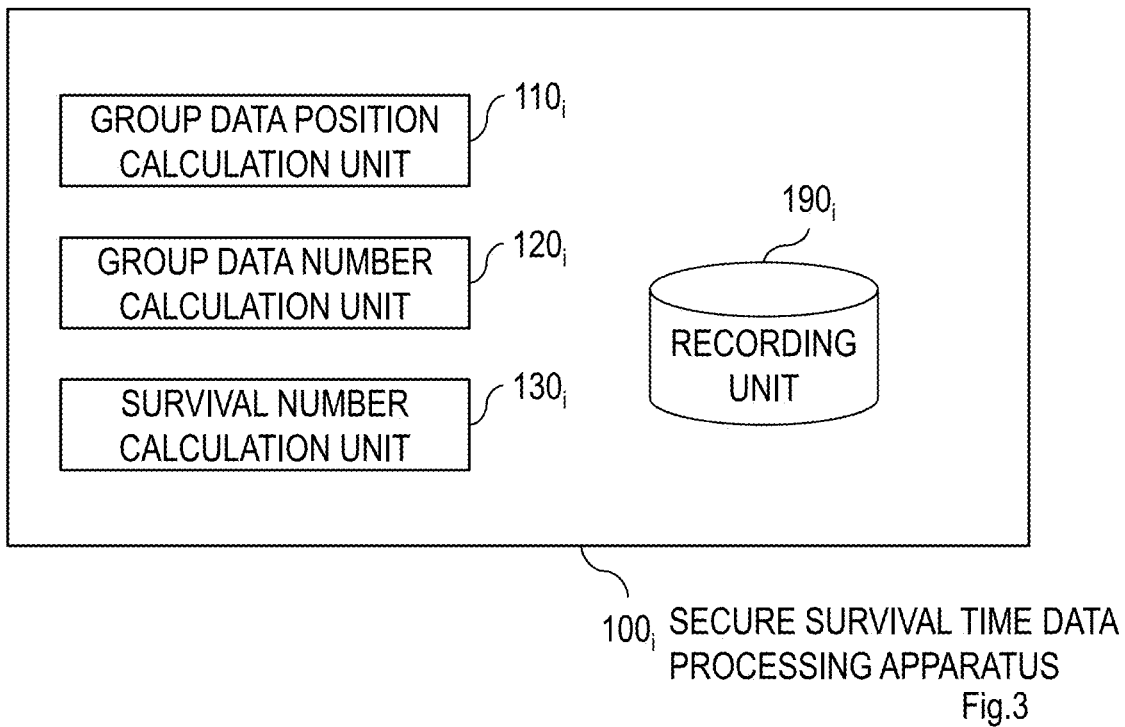
FIG. 3 is a block diagram illustrating a configuration of a secure survival time data processing apparatus $100_i$.
Figure 4:
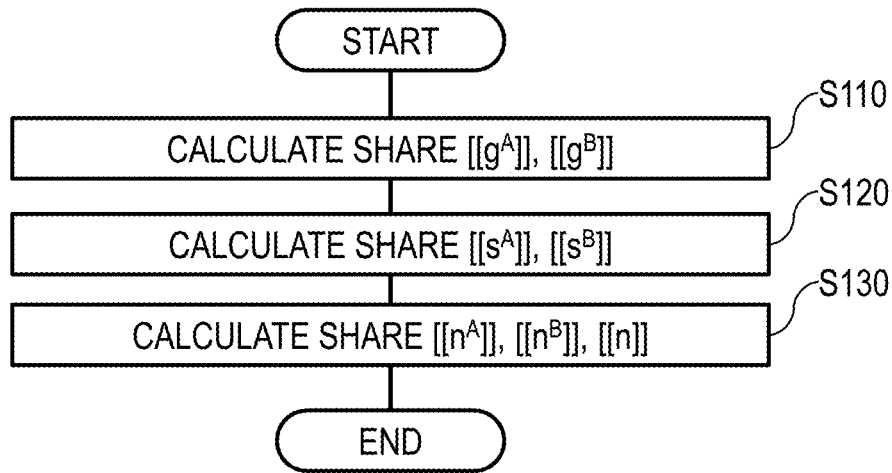
FIG. 4 is a flowchart illustrating an operation of the secure survival time data processing system 10.

A secure survival time data processing system 10 will be described below with reference to FIGS. 2 to 4. FIG. 2 is a block diagram illustrating a configuration of the secure survival time data processing system 10. The secure survival time data processing system 10 includes W (W is a predetermined integer greater than or equal to 3) secure survival time data processing apparatuses $100_1, \ldots, 100_W$. The secure survival time data processing apparatuses $100_1, \ldots, 100_W$ are connected to a network 800 and are capable of communicating with each other. The network 800 may be, for example, a communication network such as the Internet or a broadcast communication path. FIG. 3 is a block diagram illustrating a configuration of a secure survival time data processing apparatus $100_i$ ($1 \leq i \leq W$). FIG. 4 is a flowchart illustrating an operation of the secure survival time data processing system 10.

As illustrated in FIG. 3, the secure survival time data processing apparatus 100 includes a group data position calculation unit $110_i$, a group data number calculation unit $120_i$, a survival number calculation unit $130_i$, and a recording unit $190_i$. Each of the components of the secure survival time data processing apparatus $100_i$ excluding the recording unit $190_i$ is configured such that operations required for the secure computing, specifically, operations required to implement functions of each of the components among at least concealment, arithmetic operation, equal sign determination, inequality sign determination, secure batch mapping, and group sum, or real number calculation can be executed. Specific functional configurations for implementing individual operations in the present invention are sufficient to be configurations such that the algorithms disclosed in, for example, each of the Reference NPLs 1 to 7 can be executed, and these are conventional configurations, so the detailed description thereof will be omitted. The recording unit $190_i$ is a component that records information required for processing executed by the secure survival time data processing apparatus $100_i$. For example, the recording unit $190_i$ records N shares (where N is an integer greater than or equal to 1) of survival time data. Here, the survival time data is data including values of three attributes of time, state, and group, where the value of the state is a binary value representing death by 1 or the other states by 0, and the value of the group is a binary value of A representing a group of subjects and B representing another group different from the group A. Hereinafter, N pieces of survival time data is referred to as a survival time data set D. A set of survival time data in which the value of the group is A is referred to as group A, and a set of survival time data in which the value of the group is B is referred to as group B.

By way of a coordinate calculation by the W secure survival time data processing apparatuses $100_i$, the secure survival time data processing system 10 implements secure computing on survival time data, which is a multi-party protocol. Thus, a group data position calculation means 110 (not illustrated) of the secure survival time data processing system 10 is constituted with the group data position calculation units $110_1, \ldots, 110_W$, a group data number calculation means 120 (not illustrated) is constituted with the group data number calculation units $120_1, \ldots, 120_W$, and a survival number calculation means 130 (not illustrated) is constituted with the survival number calculation units $130_1, \ldots, 130_W$.

The secure survival time data processing system 10 calculates a share $[[n^A]]$ of the number of surviving $n^A$ for each time of group A, a share $[[n^B]]$ of the number of surviving $n^B$ for each time of group B, and a share [[n]] of the total number of surviving n for each time, from a share [[D]] of the survival time data set D. The operation of the secure survival time data processing system 10 will be described below with reference to FIG. 4. Note that [[t]] is a share of a sequence t of the values of the time of the survival time data included in the survival time data set D, [[s]] is a share of a sequence s of the values of the state of the survival time data included in the survival time data set D, and [[g]] is a share of a sequence g of the values of the group of the survival time data included in the survival time data set D.

At S110, the group data position calculation means 110 calculates and outputs a share $[[g^A]]$ of a sequence $g^A$ and a share $[[g^B]]$ of a sequence $g^B$ represented by the following equations from the share [[g]] with the share [[D]] as an input.

$$g_i^A = \begin{cases} 1 & (g_i = A) \\ 0 & (g_i \neq A) \end{cases} \quad \text{[Math. 7]}$$

$$g_i^B = \begin{cases} 1 & (g_i = B) \\ 0 & (g_i \neq B) \end{cases}$$

Where, $g_i$, $g_i^A$, and $g_i^B$ ($1 \leq i \leq N$) represent the i-th element in the sequence g, the i-th element in the sequence $g^A$, and the i-th element in the sequence $g^B$, respectively.

Specifically, the group data position calculation means 110 performs secure computing of the equal sign determination of values A and B as follows.

$$[[g_i^A]] \leftarrow [[g_i]] =_? [[A]] (i=1, \ldots N)$$

$$[[g_i^B]] \leftarrow [[g_i]] =_? [[B]] (i=1, \ldots N) \quad \text{[Math. 8]}$$

At S120, the group data number calculation means 120 calculates and outputs a share $[[s^A]]$ and a shares $[[s^B]]$ from a share [[t]], the share $[[g^A]]$, and the share $[[g^B]]$, by $[[s^A]]$=GroupSum ($[[g^A]]$, [[t]]), $[[s^B]]$=GroupSum ($[[g^B]]$, [[t]]), with the share [[D]], and the share $[[g^A]]$ and the share $[[g^B]]$ calculated at S110 as inputs. Where, $s^A$ and $s^B$ correspond to the number of data in which death or observation censoring has occurred at each time for group A, and the number of data in which death or observation censoring has occurred at each time for group B, respectively.

At S130, the survival number calculation means 130 calculates and outputs a share $[[n^A]]$ and a share $[[n^B]]$ from the share $[[s^A]]$ and the share $[[s^B]]$, with the share $[[s^A]]$ and the share $[[s^B]]$ calculated at S120 as inputs. Specifically, the survival number calculation means 130 performs secure computing as follows.

$$[[n_i^A]] \leftarrow \sum_{i=1}^{K} [[s_i^A]]$$ [Math. 9]

$$[[n_i^B]] \leftarrow \sum_{i=1}^{K} [[s_i^B]]$$

Where, K is an integer of 1 or greater and N or less, and is the number of data of different times included in the sequence t of the values of time.

$[[n_i^A]] \leftarrow [[n_{i-1}^A]] - [[s_{i-1}^A]] (i=2, \ldots K)$ $[[n_i^B]] \leftarrow [[n_{i-1}^B]] - [[s_{i-1}^B]] (i=2, \ldots K)$ [Math. 10]

In addition, the survival number calculation means 130 calculates and outputs a share $[[n]]$ from the share $[[n^A]]$ and the share $[[n^B]]$. Specifically, the survival number calculation means 130 performs secure computing as follows.

$[[n_i]] \leftarrow [[n_i^A]] + [[n_i^B]] (i=1, \ldots K)$

According to the embodiment of the present invention, the number of surviving can be calculated while still concealing the survival time data.

Second Embodiment

Figure 5:
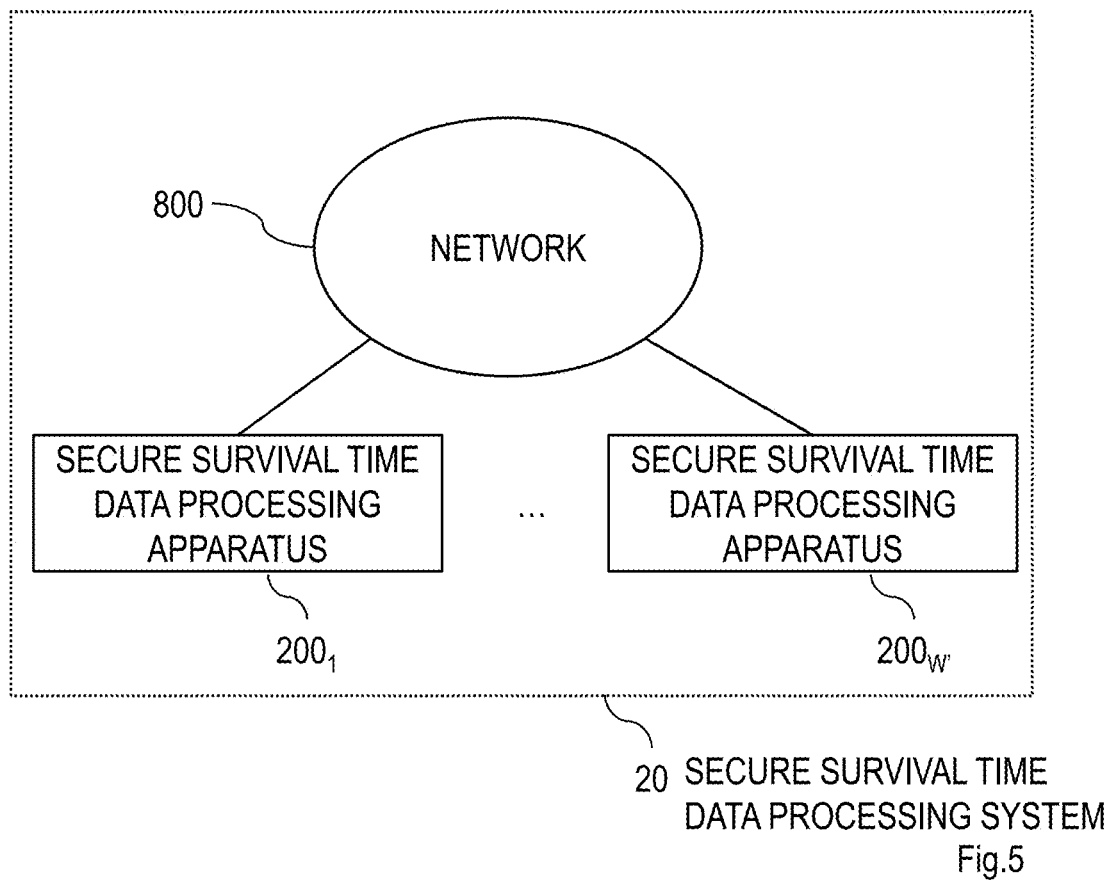
FIG. 5 is a block diagram illustrating a configuration of a secure survival time data processing system 20.
Figure 6:
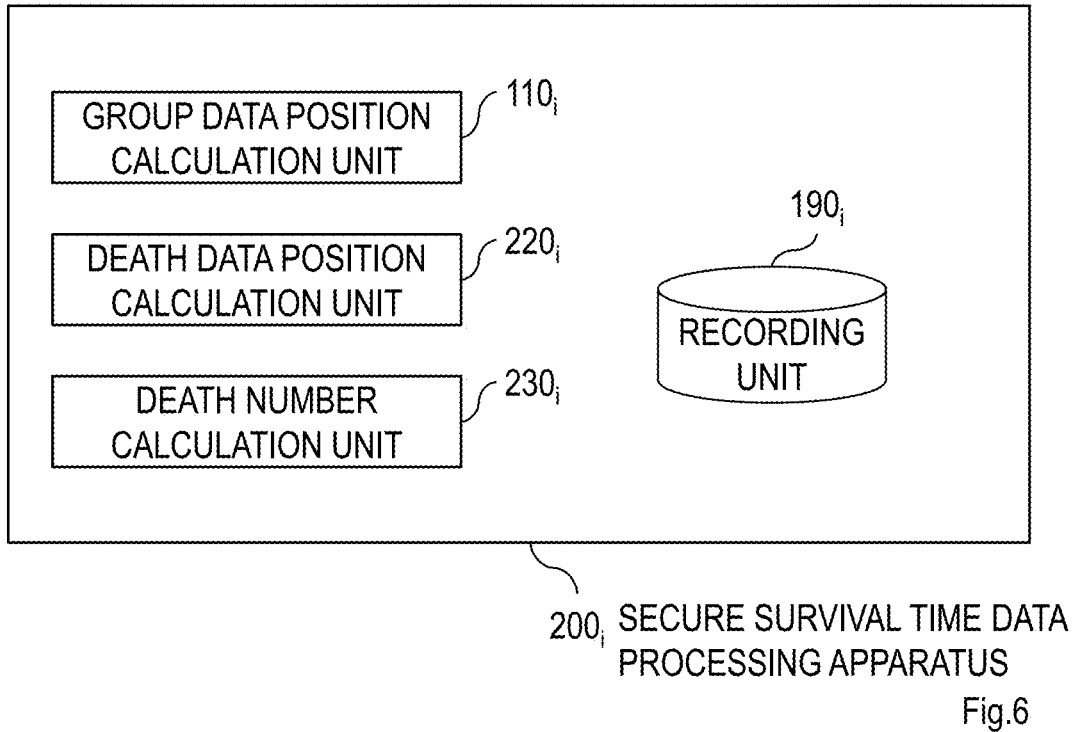
FIG. 6 is a block diagram illustrating a configuration of a secure survival time data processing apparatus $200_i$.
Figure 7:
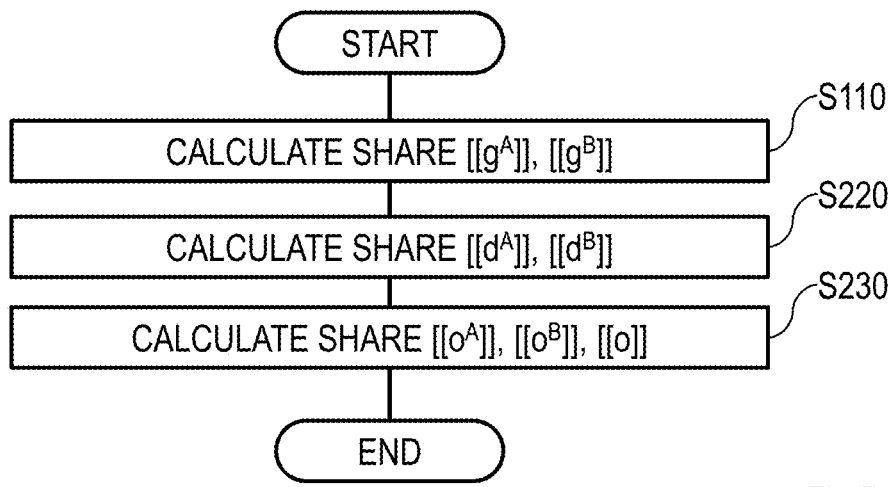
FIG. 7 is a flowchart illustrating an operation of the secure survival time data processing system 20.

A secure survival time data processing system 20 will be described below with reference to FIGS. 5 to 7. FIG. 5 is a block diagram illustrating a configuration of the secure survival time data processing system 20. The secure survival time data processing system 20 includes W' (W' is a predetermined integer greater than or equal to 3) secure survival time data processing apparatuses $200_i, \ldots, 200_{W'}$. The secure survival time data processing apparatuses $200_1, \ldots, 200_{W'}$ are connected to a network 800 and are capable of communicating with each other. The network 800 may be, for example, a communication network such as the Internet or a broadcast communication path. FIG. 6 is a block diagram illustrating a configuration of a secure survival time data processing apparatus $200_i$ ($1 \leq i \leq W'$). FIG. 7 is a flowchart illustrating an operation of the secure survival time data processing system 20.

As illustrated in FIG. 6, the secure survival time data processing apparatus $200_i$ includes a group data position calculation unit $110_i$, a death data position calculation unit $220_i$, a death number calculation unit $230_i$, and a recording unit $190_i$. Each of the components of the secure survival time data processing apparatus $200_i$ excluding the recording unit $190_i$ is configured such that operations required for the secure computing, specifically, operations required to implement functions of each of the components among at least concealment, arithmetic operation, equal sign determination, inequality sign determination, secure batch mapping, and group sum, or real number calculation can be executed. Specific functional configurations for implementing individual operations in the present invention are sufficient to be configurations such that the algorithms disclosed in, for example, each of the Reference NPLs 1 to 7 can be executed, and these are conventional configurations, so the detailed description thereof will be omitted. The recording unit $190_i$ is a component that records information required for processing executed by the secure survival time data processing apparatus $200_i$. For example, the recording unit $190_i$ records N shares (where N is an integer greater than or equal to 1) of survival time data. Here, the survival time data is data including values of three attributes of time, state, and group, where the value of the state is a binary value representing death by 1 or the other states by 0, and the value of the group is a binary value of A representing a group of subjects and B representing another group different from the group A. Hereinafter, N pieces of survival time data is referred to as a survival time data set D. A set of survival time data in which the value of the group is A is referred to as group A, and a set of survival time data in which the value of the group is B is referred to as group B.

Byway of a coordinate calculation by the W' secure survival time data processing apparatuses $200_i$, the secure survival time data processing system 20 implements secure computing on survival time data, which is a multi-party protocol. Thus, a group data position calculation means 110 (not illustrated) of the secure survival time data processing system 20 is constituted with the group data position calculation units $110_i, \ldots, 110_{W'}$, a death data position calculation means 220 (not illustrated) is constituted with the death data position calculation units $220_1, \ldots, 220_{W'}$, and a death number calculation means 230 (not illustrated) is constituted with the death number calculation units $230_1, \ldots, 230_{W'}$.

The secure survival time data processing system 20 calculates a share $[[o^A]]$ of the number of deaths $o^A$ for each time of group A, a share $[[o^B]]$ of the number of deaths $o^B$ for each time of group B, and a share $[[o]]$ of the total number of deaths o for each time, from a share $[[D]]$ of the survival time data set D. The operation of the secure survival time data processing system 20 will be described below with reference to FIG. 7. Note that $[[t]]$ is a share of a sequence t of the values of the time of the survival time data included in the survival time data set D, $[[s]]$ is a share of a sequence s of the values of the state of the survival time data included in the survival time data set D, and $[[g]]$ is a share of a sequence g of the values of the group of the survival time data included in the survival time data set D.

At S110, the group data position calculation means 110 calculates and outputs a share $[[g^A]]$ of a sequence $g^A$ and a share $[[g^B]]$ of a sequence $g^B$ represented by the following equations from the share $[[g]]$ with the share $[[D]]$ as an input.

$$g_i^A = \begin{cases} 1 & (g_i = A) \\ 0 & (g_i \neq A) \end{cases}$$ [Math. 12]

$$g_i^B = \begin{cases} 1 & (g_i = B) \\ 0 & (g_i \neq B) \end{cases}$$

Where, $g_i$, $g_i^A$, and $g_i^B$ ($1 \leq i \leq N$) represent the i-th element in the sequence g, the i-th element in the sequence $g^A$, and the i-th element in the sequence $g^B$ respectively.

At S220, the death data position calculation means 220 calculates and outputs a share $[[d^A]]$ and a share $[[d^B]]$ represented by the following equations, from a share $[[s]]$, the share $[[g^A]]$, and the share $[[g^B]]$, with the share $[[D]]$, and the share $[[g^A]]$ and the share $[[g^B]]$ calculated at S110 as inputs. Specifically, the death data position calculation means 220 performs secure computing as follows.

$$[[d_i^A]]=[[s_i]]\times[[g_i^A]](i=1,\ldots N)$$

$$[[d_i^B]]=[[s_i]]\times[[g_i^B]](i=1,\ldots N) \quad [\text{Math. 13}]$$

Where, $[[d^A]]$, $[[d_i^B]]$, and $[[s_i]]$ ($1 \le i \le N$) represent the i-th element of the share $[[d^A]]$, the i-th element of the share $[[d^B]]$, and the i-th element of the share $[[s]]$, respectively.

Here, the i-th element $d_i^A$ of $d^A$ and the i-th element $d_i^B$ of $d^B$ correspond to a value identifying death data for group A and a value identifying death data for group B, respectively. That is, in the case of death data, $d_i^A=1$ and $d_i^B=1$, and in a case of the other data, $d_i^A=0$ and $d_i^B=0$.

At S230, the death number calculation means 230 calculates and outputs a share $[[o^A]]$ and a share $[[o^B]]$ from a share $[[t]]$, the share $[[d^A]]$, and the share $[[d^B]]$, by $[[o^A]]=$ GroupSum $([[d^A]], [[t]])$, $[[o^B]]=$GroupSum $([[d^B]], [[t]])$, with the share $[[D]]$, and the share $[[d^A]]$ and the share $[[d^D]]$ calculated at S220 as inputs.

In addition, the death number calculation means 230 calculates and outputs a share $[[o]]$ from the share $[[o^A]]$ and the share $[[o^B]]$. Specifically, the death number calculation means 230 performs secure computing as follows.

$$[[o_i]] \leftarrow [[o_i^A]]+[[o_i^B]](=1,\ldots K) \quad [\text{Math. 14}]$$

Where, K is an integer of 1 or greater and N or less, and is the number of data of different times included in the sequence t of the values of time.

According to the embodiment of the present invention, the number of deaths can be calculated while still concealing the survival time data.

Third Embodiment

Figure 8:
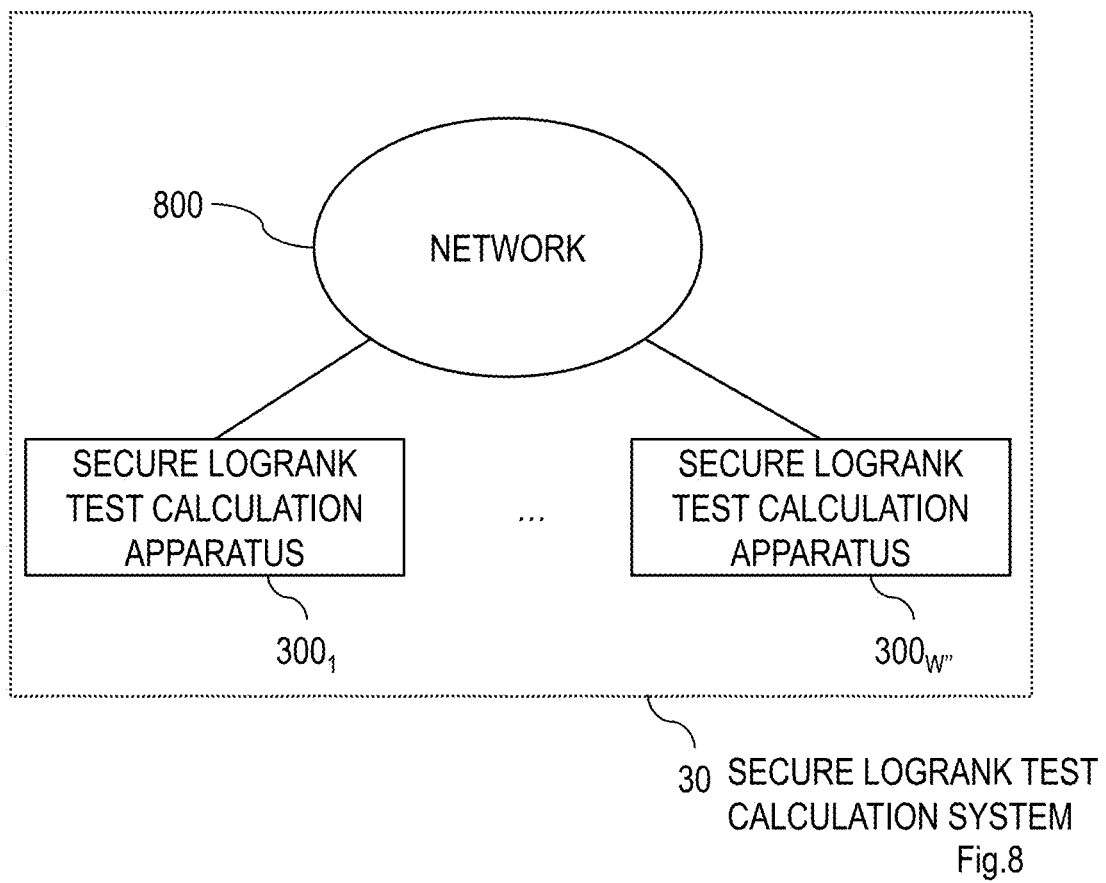
FIG. 8 is a block diagram illustrating a configuration of a secure logrank test calculation system 30.
Figure 9:
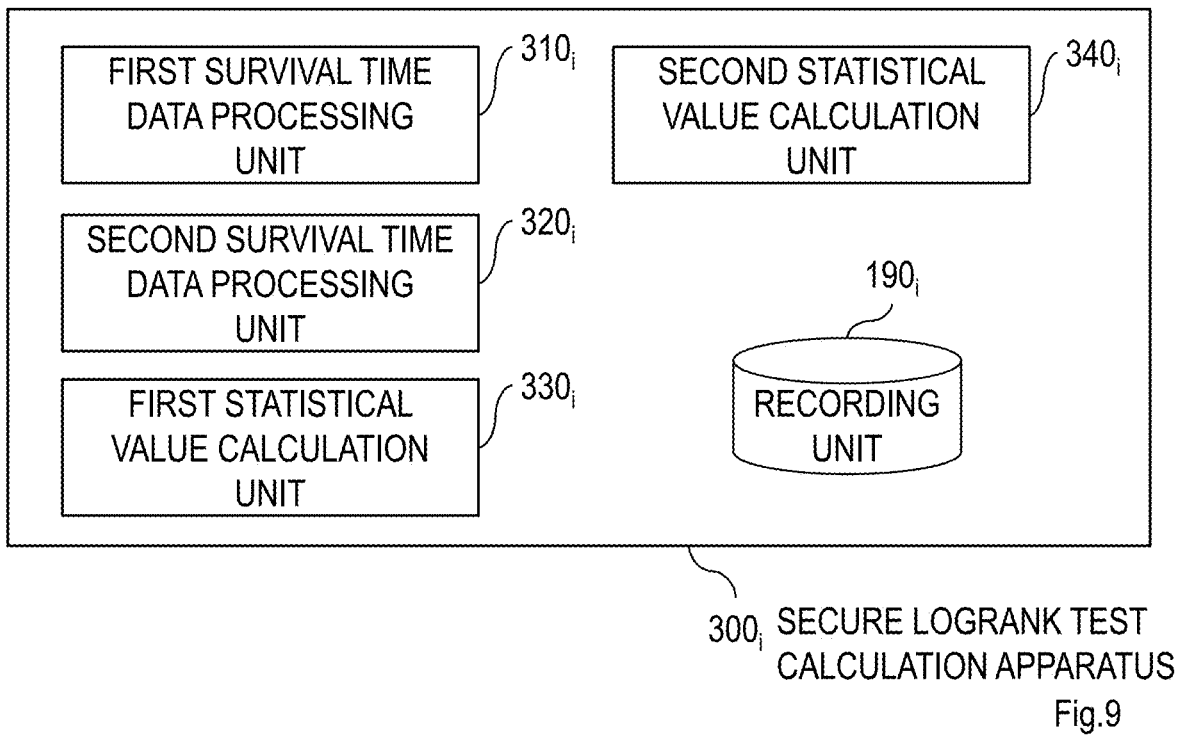
FIG. 9 is a block diagram illustrating a configuration of a secure logrank test calculation apparatus $300_i$.
Figure 10:
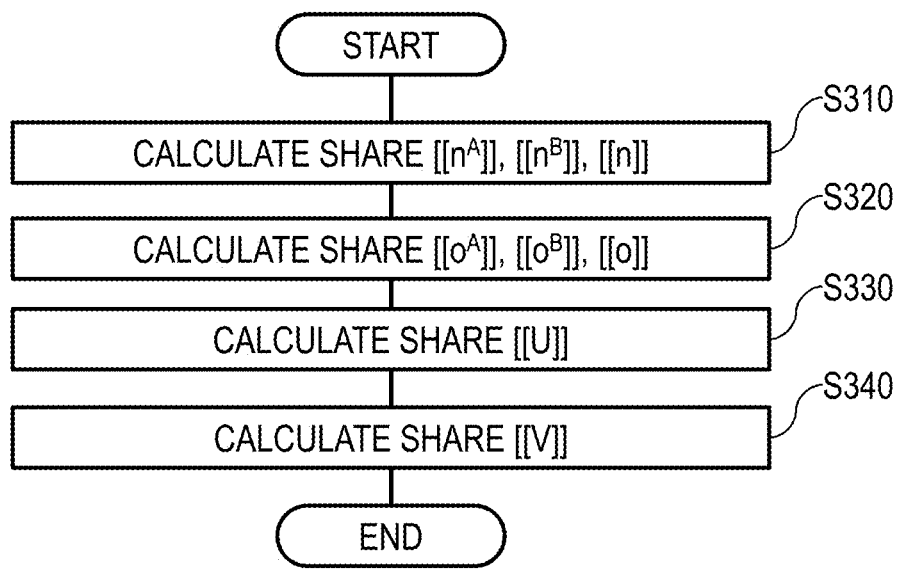
FIG. 10 is a flowchart illustrating an operation of the secure logrank test calculation system 30.

A secure logrank test calculation system 30 will be described below with reference to FIGS. 8 to 10. FIG. 8 is a block diagram illustrating a configuration of the secure logrank test calculation system 30. The secure logrank test calculation system 30 includes W'' (W'' is a predetermined integer greater than or equal to 3) secure logrank test calculation apparatuses $300_1, \ldots, 300_{W''}$. The secure logrank test calculation apparatuses $300_1, \ldots, 300_{W''}$ are connected to a network 800 and are capable of communicating with each other. The network 800 may be, for example, a communication network such as the Internet or a broadcast communication path. FIG. 9 is a block diagram illustrating a configuration of a secure logrank test calculation apparatus $300_i$ ($1 \le i \le W''$). FIG. 10 is a flowchart illustrating an operation of the secure logrank test calculation system 30.

As illustrated in FIG. 9, the secure logrank test calculation apparatus $300_i$ includes a first survival time data processing unit $310_i$, a second survival time data processing unit $320_i$, a first statistical value calculation unit $330_i$, a second statistical value calculation unit $340_i$, and a recording unit $190_i$. Each of the components of the secure logrank test calculation apparatus $300_i$ excluding the recording unit $190_i$ is configured such that operations required for the secure computing, specifically, operations required to implement functions of each of the components among at least concealment, arithmetic operation, equal sign determination, inequality sign determination, secure batch mapping, and group sum, or real number calculation can be executed. Specific functional configurations for implementing individual operations in the present invention are sufficient to be configurations such that the algorithms disclosed in, for example, each of the Reference NPLs 1 to 7 can be executed, and these are conventional configurations, so the detailed description thereof will be omitted. The recording unit $190_i$ is a component that records information required for processing executed by the secure logrank test calculation apparatus $300_i$. For example, the recording unit $190_i$ records N shares (where N is an integer greater than or equal to 1) of survival time data. Here, the survival time data is data including values of three attributes of time, state, and group, where the value of the state is a binary value representing death by 1 or the other states by 0, and the value of the group is a binary value of A representing a group of subjects and B representing another group different from the group A. Hereinafter, N pieces of survival time data is referred to as a survival time data set D. A set of survival time data in which the value of the group is A is referred to as group A, and a set of survival time data in which the value of the group is B is referred to as group B.

By way of a coordinate calculation by the W'' secure logrank test calculation apparatuses $300_i$, the secure logrank test calculation system 30 implements secure computing on survival time data, which is a multi-party protocol. Thus, a first survival time data processing means 310 (not illustrated) of the secure logrank test calculation system 30 is constituted with the first survival time data processing units $310_1, \ldots, 310_{W''}$, a second survival time data processing means 320 (not illustrated) is constituted with the second survival time data processing units $320_i, \ldots, 320_{W''}$, a first statistical value calculation means 330 (not illustrated) is constituted with the first statistical value calculation units $330_1, \ldots, 330_{W''}$, and a second statistical value calculation means 340 (not illustrated) is constituted with the second statistical value calculation units $340_1, \ldots, 340_{W''}$.

The secure logrank test calculation system 30 calculates a share $[[U]]$ of the difference U between the total number of deaths in group A and the expected value of the number of deaths in group A, and a share $[[V]]$ of the variance V of the difference U, from a share $[[D]]$ of the survival time data set D. The operation of the secure logrank test calculation system 30 will be described below with reference to FIG. 10. Note that $[[t]]$ is a share of a sequence t of the values of the time of the survival time data included in the survival time data set D, $[[s]]$ is a share of a sequence s of the values of the state of the survival time data included in the survival time data set D, and $[[g]]$ is a share of a sequence g of the values of the group of the survival time data included in the survival time data set D.

At S310, the first survival time data processing means 310 calculates and outputs a share $[[n^A]]$ of the number of surviving $n^A$ for each time of group A, a share $[[n^B]]$ of the number of surviving $n^B$ for each time of group B, and a share $[[n]]$ of the total number of surviving n for each time, from the share $[[D]]$, with the share $[[D]]$ as an input. The first survival time data processing means 310 is configured to perform calculation using, for example, the secure survival time data processing system 10.

At S320, the second survival time data processing means 320 calculates and outputs a share $[[o^A]]$ of the number of deaths $o^A$ for each time of group A, a share $[[o^B]]$ of the number of deaths $o^B$ for each time of group B, and a share $[[o]]$ of the total number of deaths o for each time, from the share $[[D]]$, with the share $[[D]]$ as an input. The second survival time data processing means 320 is configured to perform calculation using, for example, the secure survival time data processing system 20.

At S330, the first statistical value calculation means 330 calculates and outputs a share $[[U]]$, from the share $[[n^A]]$, the share [[n]], the share [[o^A]], and the share [[o]], with the share [[n^A]] and the share [[n]] calculated at S310 and the share [[o^A]] and the share [[o]] calculated at S320 as inputs. Specifically, the first statistical value calculation means 330 performs secure computing as follows.

$$[[U]] \leftarrow \sum_{i=1}^{K} \left( [[o_i^A]] - [[n_i^A]] \times [[o_i]] \times \frac{1}{[[n_i]]} \right)$$ [Math. 15]

Where, K is an integer of 1 or greater and N or less, and is the number of data of different times included in the sequence t of the values of time.

At S340, the second statistical value calculation means 340 calculates and outputs a share [[V]], from the share [[n^A]], the share [[n^B]], the share [[n]], and the share [[o]], with the share [[n^A]], the share [[n^B]], and the share [[n]] calculated at S310 and the share [[o]] calculated at S320 as inputs. Specifically, the second statistical value calculation means 340 performs secure computing as follows.

$$[[V]] \leftarrow \sum_{i=1}^{K} \Big( [[n_i^A]] \times [[n_i^B]] \times$$

$$[[o_i]] \times ([[n_i]] - [[o_i]]) \times \frac{1}{[[n_i]]} \times \frac{1}{[[n_i]]} \times \frac{1}{[[n_i]] - 1} \Big)$$ [Math. 16]

Note that secure computing of floating point numbers may be used or secure computing of fixed point numbers may be used for the secure computing of S330 and S340. In a case where secure computing of floating point numbers is used, a calculation of the accuracy equivalent to plaintext can be performed. In a case where secure computing of fixed point numbers is used, the calculation can be performed at a higher speed compared to the case where floating point numbers are used. Note that even in the case of secure computing of fixed point numbers, for example, by setting decimal part to approximately 34 bits, calculation with very high accuracy such that the relative error with plaintext is less than 1% is possible.

By restoring the share [[U]] and the share [[V]], the plaintext U of the share [[U]] and the plaintext V of the share [[V]] can be obtained. Thus, a test can be performed by determining the p-value using the plaintext U and the plaintext V.

According to the embodiment of the present invention, logrank test can be calculated while still concealing the survival time data.

Modified Example

In a logrank test, division is used in calculating an expected value or the like. However, a division by zero may occur depending on the input data. At this time, because each numerical value is concealed in the secure computing, it is difficult to identify the occurrence of division by zero. Thus, a form for avoiding division by zero by using secure batch mapping will be described here.

In the present modified example, a parameter (0, 1, ..., N) (where N is the number of survival time data included in the survival time data set D) representing the domain of definition and a parameter (0, 1/1, ..., 1/N) representing the range of values of function f(x)=1/x are used. Note that here the parameter (0, 1, ..., N) representing the domain of definition includes zero that is not included in the original definition of the function f(x)=1/x. The share ([[0]], [[1]], ..., [[N]]) of the parameter (0, 1, ..., N) representing the domain of definition and the parameter ([[0]], [[1/1]], ..., [([1/N])]) representing the range of values are recorded in the recording unit $190_i$ in advance. Note that a representation by floating point numbers and a representation by fixed point numbers can be used for the representation of each element of the parameter representing the range of values.

The calculations at S330 and S340 areas follows. At S330, specifically, the first statistical value calculation means 330 performs secure computing as follows.

$$[[n^{(inv)}]] \leftarrow Map_f([[n]])$$ [Math. 17]

$$[[U]] \leftarrow \sum_{i=1}^{K} ([[o_i^A]] - [[n_i^A]] \times [[o_i]] \times [[n_i^{(inv)}]])$$

Where, K is an integer of 1 or greater and N or less, and is the number of data of different times included in the sequence t of the values of time.

At S340, specifically, the second statistical value calculation means 340 performs secure computing as follows.

$$[[n_i']] \leftarrow [[n_i]] - 1 (i = 1, \ldots, K)$$ [Math. 18]

$$[[n^{(inv)}]] \leftarrow Map_f([[n]])$$

$$[[n'^{(inv)}]] \leftarrow Map_f([[n']])$$

$$[[V]] \leftarrow \sum_{i=1}^{K} ([[n_i^A]] \times [[n_i^B]] \times$$

$$[[o_i]] \times ([[n_i]] - [[o_i]]) \times [[n^{(inv)}]] \times [[n^{(inv)}]] \times [[n'^{(inv)}]])$$

By using secure batch mapping $Map_f$ of the function f(x)=1/x, it is possible to avoid the occurrence of division by zero.

Fourth Embodiment

The secure logrank test calculation system 30 according to the third embodiment calculates the share [[U]] and the share [[V]], but may calculate a share [[U²/V]] of a statistical value U²/V, or a share of the p-value. Thus, a description will be given here of a form for calculating the share [[U²/V]] of the statistical value U²/V or the share of the p-value.

Figure 11:
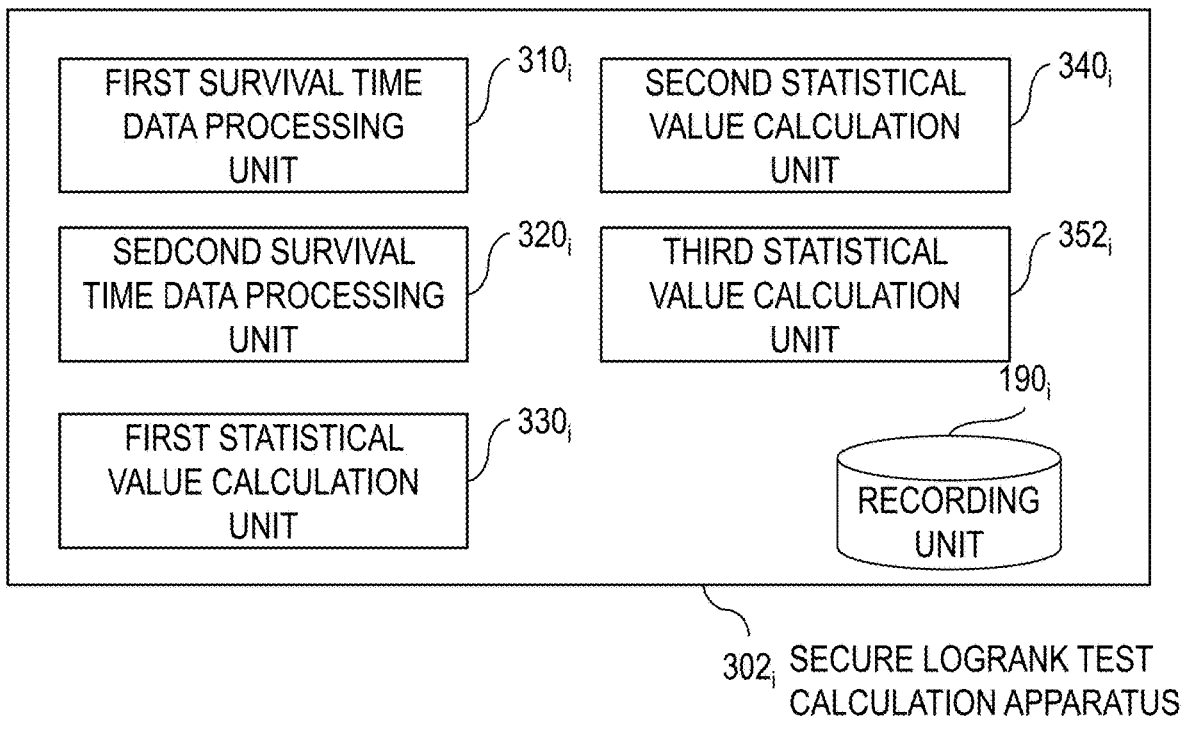
FIG. 11 is a block diagram illustrating a configuration of a secure logrank test calculation apparatus $302_i$.
Figure 12:
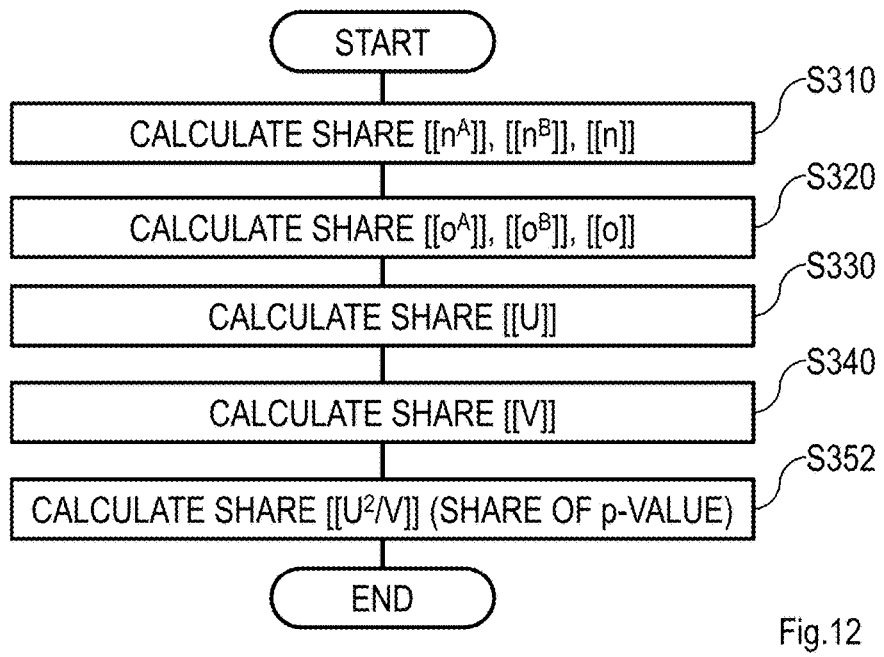
FIG. 12 is a flowchart illustrating an operation of a secure logrank test calculation system 32.

Hereinafter, a secure logrank test calculation system 32 (not illustrated) according to the present embodiment will be described with reference to FIGS. 11 and 12. FIG. 11 is a block diagram illustrating a configuration of a secure logrank test calculation apparatus $302_i$ (1≤i≤W"). FIG. 12 is a flowchart illustrating an operation of the secure logrank test calculation system 32.

The secure logrank test calculation system 32 differs from the secure logrank test calculation system 30 in that W" (W" is a predetermined integer greater than or equal to 3) secure logrank test calculation apparatuses $302_1, \ldots, 302_{W"}$ are included instead of including W" secure logrank test calculation apparatuses $300_1, \ldots, 300_{W"}$. The secure logrank test calculation apparatus $302_i$ is different from the secure logrank test calculation apparatus $300_i$ in that the secure logrank test calculation apparatus $302_i$ further includes a third statistical value calculation unit $352_i$ (see FIG. 11). The third statistical value calculation unit $352_i$ is also configured such that operations required for the secure computing or real number calculation can be executed in the same manner as each of the components of the secure logrank test calculation apparatus $300_i$ excluding the recording unit $190_i$.

Byway of a coordinate calculation by the W" secure logrank test calculation apparatuses $302_i$, the secure logrank test calculation system 32 implements secure computing on survival time data, which is a multi-party protocol. Thus, a third statistical value calculation means 352 (not illustrated) of the secure logrank test calculation system 32 is also constituted with the third statistical value calculation units $352_1, \ldots, 352_{W''}$.

The secure logrank test calculation system 32 calculates the share $[[U^2/V]]$ of the statistical value $U^2/V$ (where U is the difference between the total number of deaths in group A and the expected value of the number of deaths in group A, and V is the variance of the difference U), from the share $[[D]]$ of the survival time data set D. The operation of the secure logrank test calculation system 32 will be described below with reference to FIG. 12. The calculations at S310 to S340 are the same as the secure logrank test calculation system 30, so the calculation at S352 will be described.

At S352, the third statistical value calculation means 352 calculates and outputs the share $[[U^2/V]]$ from the share $[[U]]$ and the share $[[V]]$, with the share $[[U]]$ calculated at S330 and the share $[[V]]$ calculated at S340 as inputs. Specifically, the third statistical value calculation means 352 performs secure computing as follows.

$$[[U^2/V]] \leftarrow [[U]] \times [[U]] \times \frac{1}{[[V]]} \quad \text{[Math. 19]}$$

By restoring the share $[[U^2/V]]$, the plaintext $U^2/V$ of the share $[[U^2/V]]$ can be obtained. Thus, a test can be performed by determining the p-value using the plaintext $U^2/V$. The accuracy of the results obtained by the method is equivalent to that of the third embodiment, and the calculation can be performed at approximately the same rate.

According to the embodiment of the present invention, logrank test can be calculated while still concealing the survival time data.

Modified Example

The third statistical value calculation means 352 may be configured as a component for calculating the share of the p-value instead of a component for calculating the share $[[U^2/V]]$ from the share $[[U]]$ and the share $[[V]]$. Thus, a case in which the third statistical value calculation means 352 is a component for calculating the share of the p-value will now be described.

In the present modified example, a parameter $(a_1, \ldots, a_M)$ representing a domain of definition and a parameter $(g(a_1), \ldots, g(a_M))$ representing a range of values of the function $g(x)$ indicating a relationship between $U^2/V$ and the p-value based on the $\chi^2$ distribution (where $a_1, \ldots, a_M$ are real numbers, and meet $a_1 < \ldots < a_M$) are prepared in advance, and these parameters are recorded in the recording unit $190_i$. The function $g(x)$ is a function indicating an approximate relationship between $U^2/V$ and the p-value, for example. Note that a representation by floating point numbers and a representation by fixed point numbers can be used for the representation of each element of the parameter representing the domain of definition and the parameter representing the range of values of the function $g(x)$.

The calculation at S352 is as follows. That is, at S352, the third statistical value calculation means 352 calculates and outputs the share of the p-value from the share $[[U]]$ and the share $[[V]]$, with the share $[[U]]$ calculated at S330 and the share $[[V]]$ calculated at S340 as inputs. Specifically, the third statistical value calculation means 352 calculates the share $[[U^2/V]]$ from the share $[[U]]$ and the share $[[V]]$, and $\text{Map}_g([[U^2/V]])$ calculated using the secure batch mapping $\text{Map}_g$ of the function $g(x)$ is the share of the p-value.

The p-value obtained by restoring the share of the p-value can be used to perform the test. The accuracy and the calculation speed of the results obtained by the present method depends on the size M of the parameter representing the domain of definition and the parameter representing the range of values used in the definition of the secure batch mapping $\text{Map}_g$.

Fifth Embodiment

The secure logrank test calculation system 32 according to the fourth embodiment calculates the share of the p-value, but does not need to directly calculate the p-value in order to achieve the purpose of the test, but may directly calculate the test results. Thus, a form for directly calculating the test results will be described here. Specifically, a comparative predicate result representing the condition of $U^2/V$ in which the test result becomes 0 (or the condition of $U^2/V$ in which the test result becomes 1) is used. The comparative predicate result is defined in advance as a predicate of an inequality sign determination from a significance level and an $\chi^2$ distribution.

Figure 13:
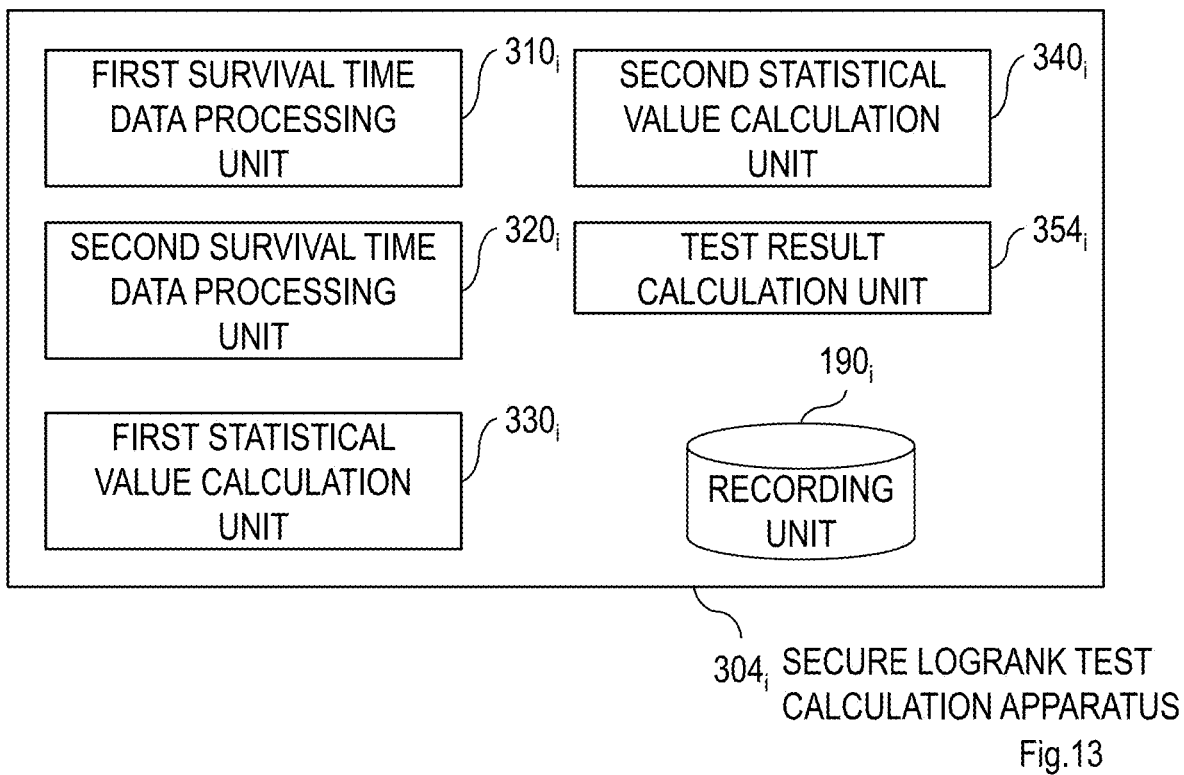
FIG. 13 is a block diagram illustrating a configuration of a secure logrank test calculation apparatus $304_i$.
Figure 14:
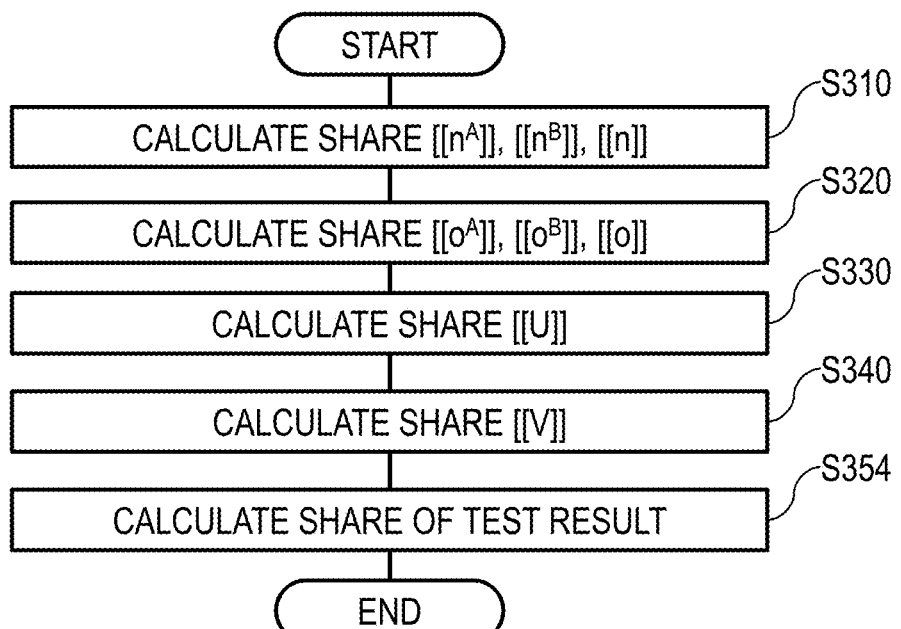
FIG. 14 is a flowchart illustrating an operation of a secure logrank test calculation system 34.

Hereinafter, a secure logrank test calculation system 34 (not illustrated) according to the present embodiment will be described with reference to FIGS. 13 and 14. FIG. 13 is a block diagram illustrating a configuration of a secure logrank test calculation apparatus $304_i$ ($1 \leq i \leq W''$). FIG. 14 is a flowchart illustrating an operation of the secure logrank test calculation system 34.

The secure logrank test calculation system 34 differs from the secure logrank test calculation system 30 in that W" (W" is a predetermined integer greater than or equal to 3) secure logrank test calculation apparatuses $304_1, \ldots, 304_{W''}$ are included instead of including W" secure logrank test calculation apparatuses $300_1, \ldots, 300_{W''}$. The secure logrank test calculation apparatus $304_i$ is different from the secure logrank test calculation apparatus $300_i$ in that the secure logrank test calculation apparatus $304_i$ further includes a test result calculation unit $354_i$ (see FIG. 13). The test result calculation unit $354_i$ is also configured such that operations required for the secure computing or real number calculation can be executed in the same manner as each of the components of the secure logrank test calculation apparatus $300_i$ excluding the recording unit $190_i$.

By way of a coordinate calculation by the W" secure logrank test calculation apparatuses $304_i$, the secure logrank test calculation system 34 implements secure computing on survival time data, which is a multi-party protocol. Thus, a test result calculation means 354 (not illustrated) of the secure logrank test calculation system 34 is also constituted with the test result calculation units $354_1, \ldots, 354_{W''}$.

The secure logrank test calculation system 34 calculates the share of the test results from the share $[[D]]$ of the survival time data set D. The operation of the secure logrank test calculation system 34 will be described below with reference to FIG. 14. The calculations at S310 to S340 are the same as the secure logrank test calculation system 30, so the calculation at S354 will be described.

At S354, the test result calculation means 354 calculates and outputs the share of the test results from the share [[U]] and the share [[V]], with the share [[U]] calculated at S330 and the share [[V]] calculated at S340 as inputs. Specifically, the test result calculation means 354 calculates the share [[$U^2/V$]] from the share [[U]] and the share [[V]], and [[result ($U^2/V$)]] calculated using the comparative predicate result is the share of the test results.

Note that the test results can be directly obtained by restoring [[result ($U^2/V$)]]. The accuracy of the results obtained by the method is equivalent to that of the third embodiment, and the calculation can be performed at approximately the same rate.

According to the embodiment of the present invention, logrank test can be calculated while still concealing the survival time data.

<Supplement>

Figure 15:
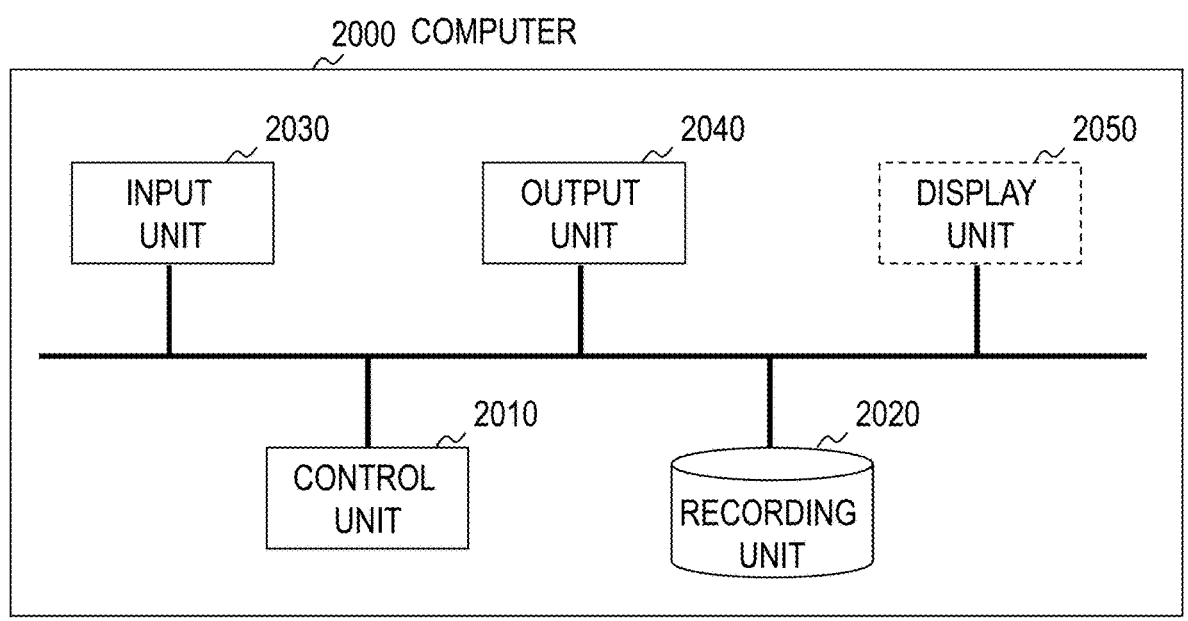
FIG. 15 is a diagram illustrating an example of a functional configuration of a computer implementing each apparatus according to the embodiments of the present invention.

FIG. 15 is a diagram illustrating an example of a functional configuration of a computer implementing each apparatus described above. The processing in each of the above-described apparatuses can be performed by causing a recording unit 2020 to read a program for causing a computer to function as each of the above-described apparatuses, and operating the program in a control unit 2010, an input unit 2030, an output unit 2040, and the like.

The apparatus according to the present invention includes, for example, as single hardware entities, an input unit to which a keyboard or the like can be connected, an output unit to which a liquid crystal display or the like can be connected, a communication unit to which a communication apparatus (for example, a communication cable) capable of communication with the outside of the hardware entity can be connected, a CPU (Central Processing Unit, which may include a cache memory, a register, and the like), a RAM or a ROM that is a memory, an external storage apparatus that is a hard disk, and a bus connected for data exchange with the input unit, the output unit, the communication unit, the CPU, the RAM, the ROM, and the external storage apparatuses. An apparatus (drive) capable of reading and writing from and to a recording medium such as a CD-ROM may be provided in the hardware entity as necessary. An example of a physical entity including such hardware resources is a general-purpose computer.

A program necessary to implement the above-described functions, data necessary for processing of this program, and the like are stored in the external storage apparatus of the hardware entity (the present invention is not limited to the external storage apparatus; for example, the program may be read out and stored in a ROM that is a dedicated storage apparatus). For example, data obtained by the processing of the program is appropriately stored in a RAM, the external storage apparatus, or the like.

In the hardware entity, each program and data necessary for the processing of each program stored in the external storage apparatus (or a ROM, for example) are read into a memory as necessary and appropriately interpreted, executed, or processed by a CPU. As a result, the CPU implements a predetermined function (each of components represented by xxx unit, xxx means, or the like).

The present invention is not limited to the above-described embodiment, and appropriate changes can be made without departing from the spirit of the present invention. The processing described in the embodiments are not only executed in time series in the described order, but also may be executed in parallel or individually according to a processing capability of an apparatus that executes the processing or as necessary.

As described above, when a processing function in the hardware entity (the apparatus of the present invention) described in the embodiment is implemented by a computer, processing content of a function that the hardware entity should have is described by a program. By executing this program using the computer, the processing function in the hardware entity is implemented on the computer.

The program in which the processing details are described can be recorded on a computer-readable recording medium. The computer-readable recording medium, for example, may be any type of medium such as a magnetic recording device, an optical disc, a magneto-optical recording medium, or a semiconductor memory. Specifically, for example, a hard disk apparatus, a flexible disk, a magnetic tape, or the like can be used as a magnetic recording apparatus, a DVD (Digital Versatile Disc), a DVD-RAM (Random Access Memory), a CD-ROM (Compact Disc Read Only Memory), CD-R (Recordable)/RW (ReWritable), or the like can be used as an optical disc, an MO (Magneto-Optical disc) or the like can be used as a magneto-optical recording medium, and an EEP-ROM (Electronically Erasable and Programmable-Read Only Memory) or the like can be used as a semiconductor memory.

The program is distributed, for example, by selling, transferring, or lending a portable recording medium such as a DVD or a CD-ROM with the program recorded on it. Further, the program may be stored in a storage device of a server computer and transmitted from the server computer to another computer via a network so that the program is distributed.

For example, a computer executing the program first temporarily stores the program recorded on the portable recording medium or the program transmitted from the server computer in its own storage device. When executing the processing, the computer reads the program stored in its own storage device and executes the processing in accordance with the read program. As another execution mode of this program, the computer may directly read the program from the portable recording medium and execute processing in accordance with the program, or, further, may sequentially execute the processing in accordance with the received program each time the program is transferred from the server computer to the computer. Another configuration to execute the processing through a so-called ASP (application service provider) service in which processing functions are implemented just by issuing an instruction to execute the program and obtaining results without transmitting the program from the server computer to the computer may be employed. Note that, the program in this mode is assumed to include information which is provided for processing of a computer and is equivalent to a program (data or the like that has characteristics of regulating processing of the computer rather than being a direct instruction to the computer).

Although the hardware entity is configured by a predetermined program being executed on the computer in the present embodiment, at least a part of the processing content of the hardware entity may be implemented in hardware.

The foregoing description of the embodiments of the present invention has been presented for purposes of illustration and description. The foregoing description does not intend to be exhaustive and does not intend to limit the invention to the precise forms disclosed. Modifications and variations are possible from the teachings above. The embodiments have been chosen and expressed in order to provide the best demonstration of the principles of the present invention, and to enable those skilled in the art to utilize the present invention in numerous embodiments and with addition of various modifications suitable for actual use considered. All such modifications and variations are within the scope of the present invention defined by the appended claims that are interpreted according to the width provided justly lawfully and fairly.

The invention claimed is:

1. A secure survival time data processing system comprising
at least three secure survival time data processing apparatuses that are connected to a network and are capable of communicating with each other, each of the at least three secure survival time data processing apparatuses including processing circuitry,
wherein the at least three secure survival time data processing apparatuses are configured to cooperatively:
calculate a share $((n^A))$ of a number of surviving $n^A$ per time of group A and a share $((n^B))$ of a number of surviving $n^B$ per time of group B, from a share $((D))$ of a survival time data set D, where data including values of three attributes of time, state, and group is referred to as survival time data, D refers to a set of N pieces (where N is an integer greater than or equal to 1) of survival time data (herein referred to as a survival time data set), a set of survival time data in which a value of group is A is referred to as group A, and a set of survival time data in which a value of group is B is referred to as group B, including
calculating a share $((g^A))$ of a sequence $g^A$ and a share $((g^B))$ of a sequence $g^B$ represented by following equations from a share $((g))$, where $((g))$ is a share of a sequence g of a plurality of values of group of survival time data included in the survival time data set D;

$$g_i^A = \begin{cases} 1 & (g_i = A) \\ 0 & (g_i \neq A) \end{cases}$$

$$g_i^B = \begin{cases} 1 & (g_i = B) \\ 0 & (g_i \neq B) \end{cases}$$

(where, $g_i$, $g_i^A$, and $g_i^B$ ($1 \leq i \leq N$) represent an i-th element in the sequence $g^A$, and an i-th element in the sequence $g^A$, and an i-th element in the sequence $g^B$, respectively)
calculating a share $((s^A))$ and a share $((s^B))$ from a share $((t))$, the share $((g^A))$, and the share $((g^B))$, by $((s^A))$=GroupSum $(((g^A)), ((t)))$, $((s^B))$=GroupSum $(((g^B)), ((t)))$, where $((t))$ is a share of a sequence t of a plurality of values of time of survival time data included in the survival time data set D; and
calculating the share $((n^A))$ and the share $((n^B))$ from the share $((s^A))$ and the share $((s^B))$,
wherein the calculated share $((n^A))$ and the calculated share $((n^B))$ are maintained in a distributed state among the at least three secure computing apparatuses.

2. A secure survival time data processing apparatus provided in a secure survival time data processing system, the secure survival time data processing system comprising
at least three secure survival time data processing apparatuses that are connected to a network and are capable of communicating with each other, each of the at least three secure survival time data processing apparatuses including processing circuitry,
wherein the at least three secure survival time data processing apparatuses are configured to cooperatively:
calculate a share $((n^A))$ of a number of surviving $n^A$ per time of group A and a share $((n^B))$ of a number of surviving $n^B$ per time of group B, from a share $((D))$ of a survival time data set D, where data including values of three attributes of time, state, and group is referred to as survival time data, D refers to a set of N pieces (where N is an integer greater than or equal to 1) of survival time data (herein referred to as a survival time data set), a set of survival time data in which a value of group is A is referred to as group A, and a set of survival time data in which a value of group is B is referred to as group B, including
calculating a share $((g^A))$ of a sequence $g^A$ and a share $((g^B))$ of a sequence $g^B$ represented by following equations from a share $((g))$, where $((g))$ is a share of a sequence g of a plurality of values of group of survival time data included in the survival time data set D;

$$g_i^A = \begin{cases} 1 & (g_i = A) \\ 0 & (g_i \neq A) \end{cases}$$

$$g_i^B = \begin{cases} 1 & (g_i = B) \\ 0 & (g_i \neq B) \end{cases}$$

(where, $g_i$, $g_i^A$, and $g_i^B$ ($1 \leq i \leq N$) represent an i-th element in the sequence g, an i-th element in the sequence $g^A$, and an i-th element in the sequence $g^B$, respectively)
calculating a share $((s^A))$ and a share $((s^B))$ from a share $((t))$, the share $((g^A))$, and the share $((g^B))$, by $((s^A))$=GroupSum $(((g^A)), ((t)))$, $((s^B))$=GroupSum $(((g^B)), ((t)))$, where $((t))$ is a share of a sequence t of a plurality of values of time of survival time data included in the survival time data set D; and
calculating the share $((n^A))$ and the share $((n^B))$ from the share $((s^A))$ and the share $((s^B))$,
wherein the calculated share $((n^A))$ and the calculated share $((n^B))$ are maintained in a distributed state among the at least three secure computing apparatuses.

3. A secure survival time data processing method in which a secure survival time data processing system comprising at least three secure survival time data processing apparatuses that are connected to a network and are capable of communicating with each other, the secure survival time data processing method comprising performing the following in a cooperative manner by the at least three secure survival time data processing apparatuses:
calculating a share $((n^A))$ of a number of surviving $n^A$ per time of group A and a share $((n^B))$ of a number of surviving $n^B$ per time of group B, from a share $((D))$ of a survival time data set D, where data including values of three attributes of time, state, and group is referred to as survival time data, D refers to a set of N pieces (where N is an integer greater than or equal to 1) of survival time data (herein referred to as a survival time data set), a set of survival time data in which a value of group is A is referred to as group A, and a set of survival time data in which a value of group is B is referred to as group B, including
a group data position calculation step of calculating a share $((g^A))$ of a sequence $g^A$ and a share $((g^B))$ of a sequence $g^B$ represented by following equations from a share $((g))$, where $((g))$ is a share of a sequence g of a plurality of values of group of survival time data included in the survival time data set D;

$$g_i^A = \begin{cases} 1 & (g_i = A) \\ 0 & (g_i \neq A) \end{cases}$$

-continued $$g_i^B = \begin{cases} 1 & (g_i = B) \\ 0 & (g_i \neq B) \end{cases}$$

(where, $g_i$, $g_i^A$, and $g_i^B$ ($1 \leq i \leq N$) represent an i-th element in the sequence g, an i-th element in the sequence $g^A$, and an i-th element in the sequence $g^B$, respectively)

a group data number calculation step of calculating a share $((s^A))$ and a share $((s^B))$ from a share $((t))$, the share $((g^A))$, and the share $((g^B))$, by $((s^A))$=GroupSum $(((g^A)), ((t)))$, $((s^B))$=GroupSum $(((g^B)), ((t)))$, where $((t))$ is a share of a sequence t of a plurality of values of time of survival time data included in the survival time data set D; and a survival number calculation step of calculating the share $((n^A))$ and the share $((n^B))$ from the share $((s^A))$ and the share $((s^B))$, wherein the calculated share $((n))$ and the calculated share $((n^B))$ are maintained in a distributed state among the at least three secure computing apparatuses.

4. A secure survival time data processing system comprising at least three secure survival time data processing apparatuses that are connected to a network and are capable of communicating with each other, each of the at least three secure survival time data processing apparatuses including processing circuitry, wherein the at least three secure survival time data processing apparatuses are configured to cooperatively:

calculate a share $((o^A))$ of a number of deaths $o^A$ per time of group A and a share $((o^B))$ of a number of deaths $o^B$ per time of group B, from a share $((D))$ of a survival time data set D, where data including a plurality of values of three attributes of time, state, and group is referred to as survival time data, D refers to a set of N pieces (where N is an integer greater than or equal to 1) of survival time data (herein referred to as a survival time data set), a set of survival time data in which a value of group is A is referred to as group A, and a set of survival time data in which a value of group is B is referred to as group B, including calculating a share $((g^A))$ of a sequence $g^A$ and a share $((g^B))$ of a sequence $g^B$ represented by following equations from a share $((g))$, where $((g))$ is a share of a sequence g of a plurality of values of group of survival time data included in the survival time data set D;

$$g_i^A = \begin{cases} 1 & (g_i = A) \\ 0 & (g_i \neq A) \end{cases}$$

$$g_i^B = \begin{cases} 1 & (g_i = B) \\ 0 & (g_i \neq B) \end{cases}$$

(where, $g_i$, $g_i^A$, and $g_i^B$ ($1 \leq i \leq N$) represent an i-th element in the sequence $g^A$, an i-th element in the sequence $g^A$, and an i-th element in the sequence $g^B$, respectively)

calculating a share $((d^A))$ and a share $((d^B))$ represented by following equations from a share $((s))$, the share $((g^A))$, and the share $((g^B))$, where $((s))$ is a share of a sequence s of a plurality of values of state of survival time data included in the survival time data set D (where 1 represents death and 0 represents other states) and $$((d_i^A)) = ((s_i)) \times ((g_i^A))$$

$$((d_i^B)) = ((s_i)) \times ((g_i^B))$$

(where, $((d_i^A))$, $((d_i^B))$, and $((s_i))$ ($1 \leq i \leq N$) represent an i-th element of the share $((d^A))$, an i-th element of the share $((d^B))$, and an i-th element of the share $((s))$, respectively)

calculating the share $((o^A))$ and the share $((o^B))$ from a share $((t))$, the share $((d^A))$, and the share $((d^B))$, where $((t))$ is a share of a sequence t of a plurality of values of time of survival time data included in the survival time data set D, wherein the calculated share $((o^A))$ and the calculated share $((o^B))$ are maintained in a distributed state among the at least three secure computing apparatuses.

5. A secure survival time data processing apparatus provided in a secure survival time data processing system, the secure survival time data processing system comprising at least three secure survival time data processing apparatuses that are connected to a network and are capable of communicating with each other, each of the at least three secure survival time data processing apparatuses including processing circuitry, wherein the at least three secure survival time data processing apparatuses are configured to cooperatively:

calculate a share $((o^A))$ of a number of deaths $o^A$ per time of group A and a share $((o^B))$ of a number of deaths $o^B$ per time of group B, from a share $((D))$ of a survival time data set D, where data including a plurality of values of three attributes of time, state, and group is referred to as survival time data, D refers to a set of N pieces (where N is an integer greater than or equal to 1) of survival time data (herein referred to as a survival time data set), a set of survival time data in which a value of group is A is referred to as group A, and a set of survival time data in which a value of group is B is referred to as group B, including calculating a share $((g^A))$ of a sequence $g^A$ and a share $((g^B))$ of a sequence $g^B$ represented by following equations from a share $((g))$, where $((g))$ is a share of a sequence g of a plurality of values of group of survival time data included in the survival time data set D;

$$g_i^A = \begin{cases} 1 & (g_i = A) \\ 0 & (g_i \neq A) \end{cases}$$

$$g_i^B = \begin{cases} 1 & (g_i = B) \\ 0 & (g_i \neq B) \end{cases}$$

(where, $g_i$, $g_i^A$, and $g_i^B$ ($1 \leq i \leq N$) represent an i-th element in the sequence g, an i-th element in the sequence $g^A$, and an i-th element in the sequence $g^B$, respectively)

calculating a share $((d^A))$ and a share $((d^B))$ represented by following equations from a share $((s))$, the share $((g^A))$, and the share $((g^B))$, where $((s))$ is a share of a sequence s of a plurality of values of state of survival time data included in the survival time data set D (where 1 represents death and 0 represents other states); and $$((d_i^A)) = ((s_i)) \times ((g_i^A))$$

$$((d_i^B)) = ((s_i)) \times ((g_i^B))$$

where, $((d_i^A))$, $((d_i^B))$, and $((s_i))$ ($1 \leq i \leq N$) represent an i-th element of the share $((d_i^A))$, an i-th element of the share $((d_i^B))$, and an i-th element of the share $((s))$, respectively)

calculating the share $((o^A))$ and the share $((o^B))$ from a share $((t))$, the share $((d^A))$ and the share $((d^B))$, where $((t))$ is a share of a sequence t of a plurality of values of time of survival time data included in the survival time data set D, wherein the calculated share $((o^A))$ and the calculated share $((o^B))$ are maintained in a distributed state among the at least three secure computing apparatuses.

6. A secure survival time data processing method in which a secure survival time data processing system comprising at least three secure survival time data processing apparatuses that are connected to a network and are capable of communicating with each other, the secure survival time data processing method comprising performing the following in a cooperative manner by the at least three secure survival time data processing apparatuses:

calculating a share $((o^A))$ of a number of deaths $o^A$ per time of group A and a share $((o^B))$ of a number of deaths $o^B$ per time of group B, from a share $((D))$ of a survival time data set D, where data including a plurality of values of three attributes of time, state, and group is referred to as survival time data, D refers to a set of N pieces (where N is an integer greater than or equal to 1) of survival time data (herein referred to as a survival time data set), a set of survival time data in which a value of group is A is referred to as group A, and a set of survival time data in which a value of group is B is referred to as group B, including a group data position calculation step of calculating a share $((g^A))$ of a sequence $g^A$ and a share $((g^B))$ of a sequence $g^B$ represented by following equations from a share $((g))$, where $((g))$ is a share of a sequence g of a plurality of values of group of survival time data included in the survival time data set D;

$$g_i^A = \begin{cases} 1 & (g_i = A) \\ 0 & (g_i \neq A) \end{cases}$$

$$g_i^B = \begin{cases} 1 & (g_i = B) \\ 0 & (g_i \neq B) \end{cases}$$

(where, $g_i$, $g_i^A$, and $g_i^B$ ($1 \leq i \leq N$) represent an i-th element in the sequence g, an i-th element in the sequence $g^A$, and an i-th element in the sequence $g^B$, respectively)

a death data position calculation step of calculating a share $((d^A))$ and a share $((d^B))$ represented by following equations from a share $((s))$, the share $((g^A))$, and the share $((g^B))$ where $((s))$ is a share of a sequence s of a plurality of values of state of survival time data included in the survival time data set D (where 1 represents death and 0 represents other states); and $$((d_i^A)) = ((s_i)) \times ((g_i^A))$$

$$((d_i^B)) = ((s_i)) \times ((g_i^B))$$

(where, $((d_i^A))$, $((d_i^B))$, and $((s_i))$ ($1 \leq i \leq N$) represent an i-th element of the share $((d^A))$, an i-th element of the share $((d^B))$, and an i-th element of the share $((s))$, respectively)

a death number calculation step of calculating the share $((o^A))$ and the share $((o^B))$ from a share $((t))$, the share $((d^A))$, and the share $((d^B))$, where $((t))$ is a share of a sequence t of a plurality of values of time of survival time data included in the survival time data set D, wherein the calculated share $((o^A))$ and the calculated share $((o^B))$ are maintained in a distributed state among the at least three secure computing apparatuses.

7. A non-transitory computer-readable storage medium storing a program for causing a computer to operate as the secure survival time data processing apparatus according to claim 2.

8. A non-transitory computer-readable storage medium storing a program for causing a computer to operate as the secure survival time data processing apparatus according to claim 5.

* * * * *